United States Patent [19]
Platt et al.

[11] 3,826,174
[45] July 30, 1974

[54] QUADRUPLE REDUNDANT CLOSED LOOP ELECTRO-HYDRAULIC SERVO SYSTEM

[75] Inventors: Walter A. Platt, Fair Lawn, N.J.; Gibson Reynolds, Tuxedo Park, N.Y.

[73] Assignee: The Bendix Corporation, Teterboro, N.J.

[22] Filed: Nov. 15, 1972

[21] Appl. No.: 306,768

Related U.S. Application Data
[63] Continuation-in-part of Ser. No. 120,522, March 3, 1971, abandoned.

[52] U.S. Cl. ............... 91/363 A, 91/411 B, 91/448
[51] Int. Cl. ......................... F15b 9/03, F15b 9/09
[58] Field of Search ......... 91/367 A, 411 B, 411 R, 91/363 R, 411 A

[56] References Cited
UNITED STATES PATENTS
| | | | |
|---|---|---|---|
| 3,242,822 | 12/1963 | Barltrop | 91/411 B |
| 3,272,090 | 9/1966 | Ellis | 91/363 A |
| 3,554,084 | 1/1971 | Rasmussen | 91/411 R |

Primary Examiner—Paul E. Maslousky
Attorney, Agent, or Firm—Anthony F. Cuoco; S. H. Hartz

[57] ABSTRACT

A quadruple redundant closed loop electro-hydraulic servo system which is operable for two failures and passive for a third failure includes force summing apparatus and means for alleviating sensitivity of said apparatus to channel-to-channel tolerances.

3 Claims, 3 Drawing Figures

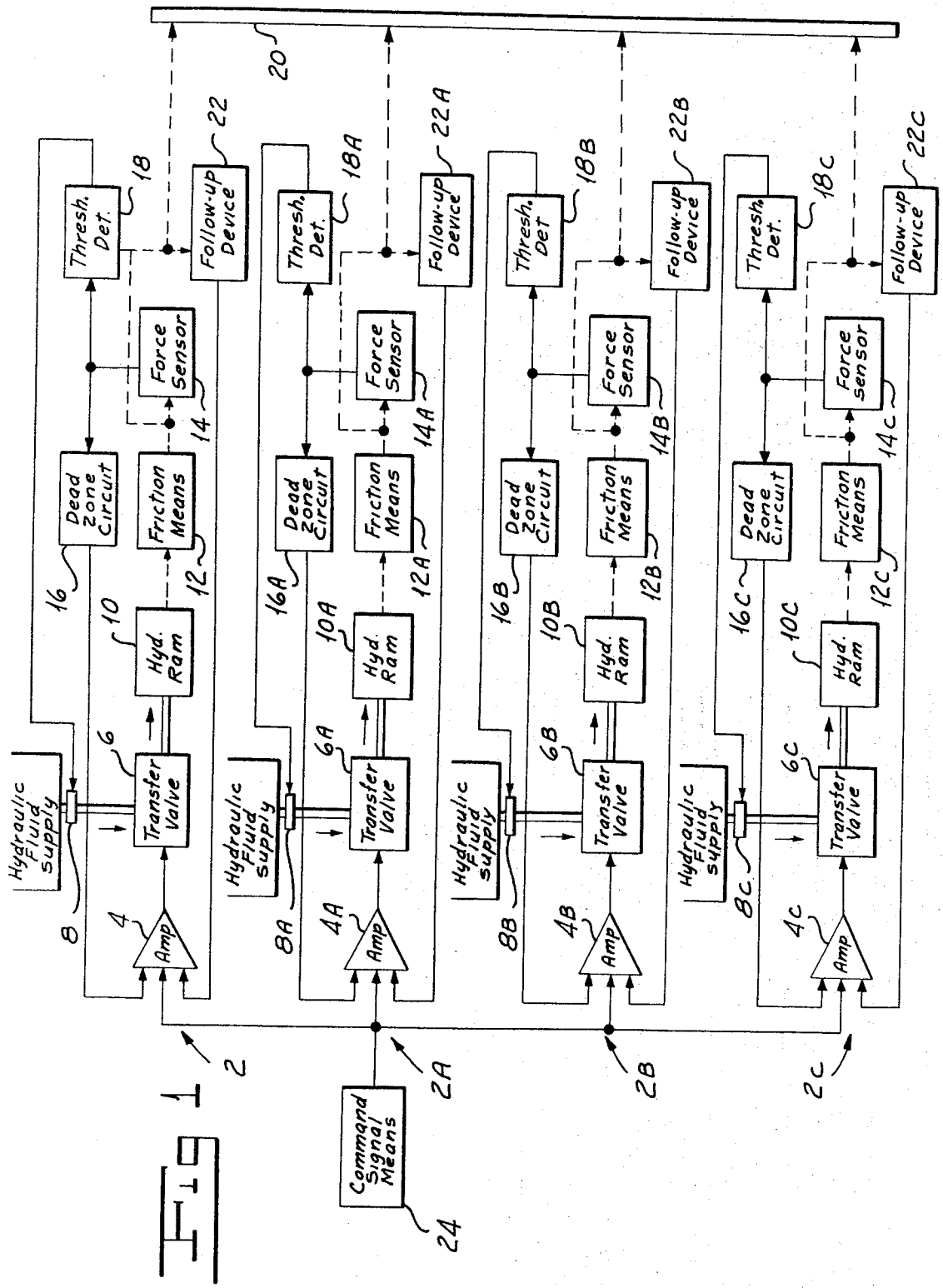

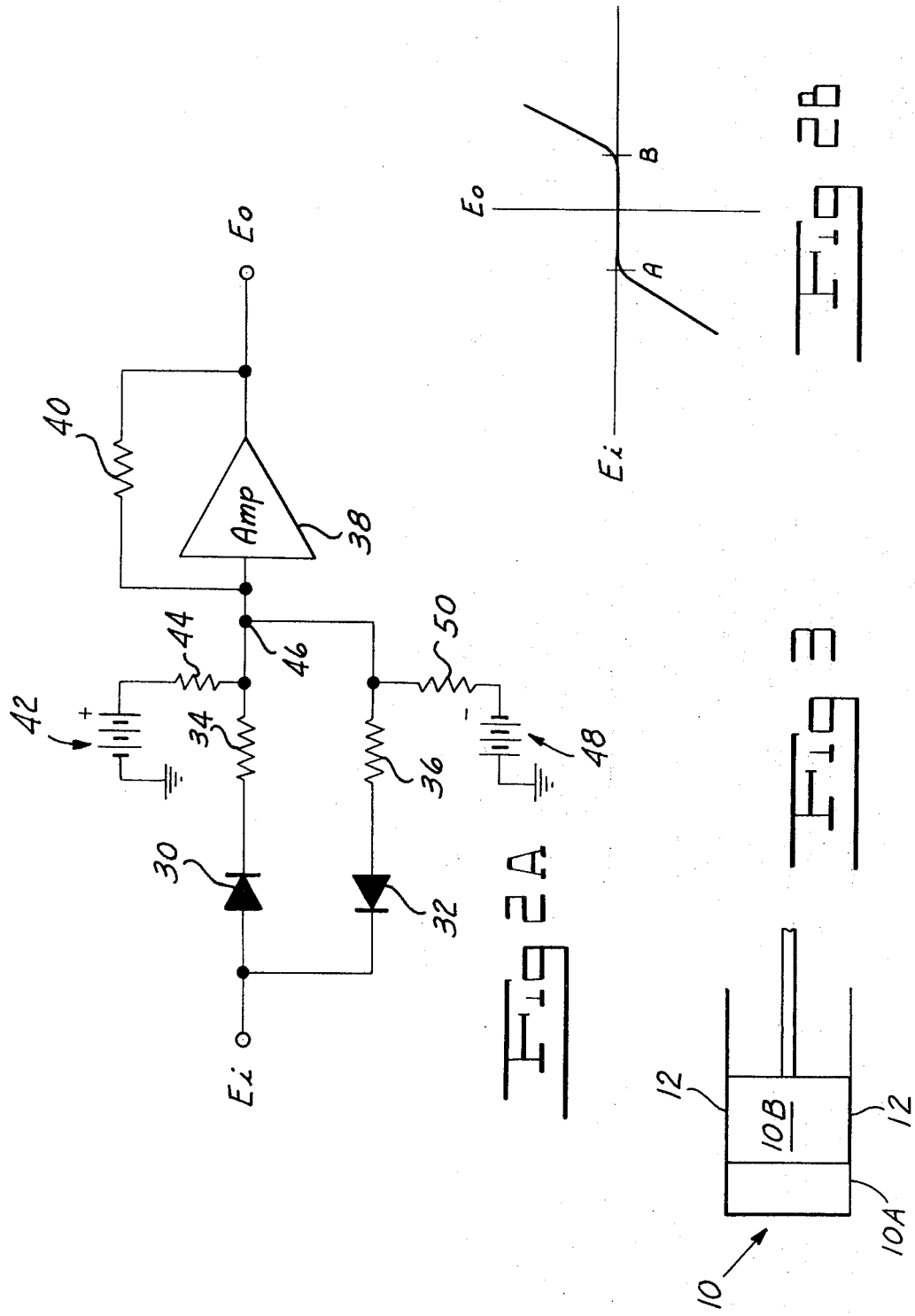

3,826,174

QUADRUPLE REDUNDANT CLOSED LOOP ELECTRO-HYDRAULIC SERVO SYSTEM

CROSS REFERENCE TO RELATED APPLICATIONS

This application is a continuation-in-part of U.S. Application Ser. No. 120,522 filed Mar. 3, 1971 now abandoned.

BACKGROUND OF THE INVENTION

1. Field of the Invention

This invention relates to closed loop electro-hydraulic servo systems and, particularly, to closed loop electro-hydraulic servo systems having a high degree of redundancy. More particularly, this invention relates to servo systems of the type described using force summing apparatus.

1. Description of the Prior Art

Designers of redundant servo systems use either force summing or position summing apparatus for connecting the mechanical outputs of each redundant channel to a common output member. The arrangement of the invention utilizes force summing apparatus which provides a simpler mechanical configuration and has the added advantage of more immediate failure correction. The invention features an arrangement which alleviates sensitivity to channel-to-channel tolerances without cross channel electrical equalizing which can result in undesirable common failure modes.

SUMMARY OF THE INVENTION

This invention contemplates an electro-hydraulic servo system in which each of four redundant channels includes means for providing friction to ground, with the friction level being set slightly larger than the maximum expected difference in hydraulic supply pressure of two remaining channels after two channels have failed. Following a third channel failure, the friction prevents displacement of a common output member due to the hydraulic supply differences and servo ram tolerances. In order to reduce the effect of the respective channels saturating in force opposition, the force exerted by each channel on the output member is sensed and applied as feedback. Since force feedback reduces the force gradient of the system, a dead-zone is provided in which there is no force feedback to detract from the force gradient.

One object of this invention is to provide an electro-hydraulic servo system having four redundant channels arranged for an extremely low probability of servo function loss in that the system is operable after two failures and passive for a third failure.

Another object of this invention is to provide a servo system of the type described using force summing means arranged to alleviate sensitivity to channel-to-channel tolerances without cross channel electrical equalizing which can result in undesirable common failure modes.

Another object of this invention is to use force feedback means for reducing the effect of the redundant channels saturating in force opposition.

Another object of this invention is to provide a dead-zone in which there is no force feedback to detract from the force gradient of the system.

These and other objects and features of the invention are pointed out in the following description in terms of the embodiment thereof which is shown in the accompanying drawings. It is to be understood, however, that the drawings are for illustration purposes only and are not a definition of the limits of the invention, reference being made to the appended claims for this purpose.

DESCRIPTION OF THE DRAWINGS

FIG. 1 is a block diagram of a servo system according to the invention.

FIG. 2A is an electrical schematic diagram of a dead-zone circuit included in the invention.

FIG. 2B is a graphical representation of the output of the dead-zone circuit of FIG. 2A.

DESCRIPTION OF THE INVENTION

FIG. 1 shows a servo system according to the invention and including four redundant channels designated by the numerals 2, 2A, 2B and 2C. Channel 2 includes a conventional type servo amplifier 4 connected to a transfer valve 6. Transfer valve 6, which may be of the type described in U.S. Pat. No. 2,835,265 issued to J. M. Brandstater on May 20, 1968, receives hydraulic fluid from a supply, and which fluid is transmitted to the valve through a regulator 8.

Transfer valve 6 transfers the hydraulic fluid for exerting a force on a hydraulic ram 10, and which ram is coupled to friction means 12. Friction means 12, in the preferred embodiment of the invention, is included as part of the hydraulic ram cylinder and serves a purpose to be hereinafter described.

A force sensor 14 senses the force applied by ram 10 after the friction and provides a signal corresponding to the sensed force. Force sensor 14 may be of the type including a strain gage in association with a Wheatsone bridge as described in U.S. Pat. No. 3,447,766 issued June 3, 1969 to R. D. Palfreyman. The signal provided by force sensor 10 is applied to a dead-zone circuit 16 having a purpose which will be hereinafter described with reference to FIG. 2A and 2B, and is applied to a threshold detector 18. Threshold detector 18 is a device of the type well known in the art and provides a signal which is applied to regulator 8 to cut-off hydraulic flow to the system when a predetermined maximum force is exceeded.

The force exerted by ram 10 is applied to a common output member and to a follow-up device 22 which provides a corresponding signal. Follow-up device 22 may be a commercially available linear variable differential voltage transformer having a movable core and primary and secondary windings, reference being made to U.S. Pat. No. 2,987,048 issued June 6, 1961 to E. R. Buxton for a device of the type which may be used in the invention.

Servo amplifier 4 receives a signal from a command signal means 24 and receives the signals from dead-zone circuit 16 and follow-up device 22, and operates transfer valve 6 in accordance with the summation of the received signals.

Channels 2A, 2B and 2C include elements identical to those recited for channel 2, but carrying the postcripts A, B and C, respectively.

Referring still to FIG. 1, the friction to ground at each ram mechanical output provided by friction means 12, 12A, 12B and 12C in channels 2, 2A, 2B and 2C, respectively, serves the purpose of rendering the system operable after two channels fail and passive after a third channel fails. After two channels have failed and the hydraulic fluid supplies to the two rams have been shut down or bypassed, the friction makes the third failure passive. In other words, after two channels have failed a third channel failure causes that channel and the remaining good channel to be in a state of force opposition due to the action of the associated follow-up signals, with relatively little displacement of output member 20 occurring. If the two supply pressures to the third and fourth channels are exactly equal, the two forces thereby created will exactly oppose and there is no further output displacement.

However, if the supply pressures are unequal and the failed channel has the higher pressure, then there is unrestrained output motion except for the friction. The friction level is, therefore, set slightly higher than the maximum expected difference in supply pressure so as to allow no displacement for a third channel failure.

For normal conditions the friction will not have a significant effect on channel performance, since the full force and force gradient works against the friction. In this connection, it is important to note that the feedback force is to be sensed after the friction, since this feedback has the effect of reducing the force gradient for forces occurring after the sensor.

Since the force gradients for the several servo channels are very high, any significant errors between the input commands, feedback signals and transfer valve amplifiers can cause the servos to saturate in force opposition. In order to reduce this effect, the individual force exerted by each servo on the output memeber is sensed and fed back to the respective servo amplifier. If the force feedback gain is made high enough, force differences due to the aforementioned errors will be reduced to insignificant amounts.

The type of servo system being described is normally used to control the valve of a high power main control surface actuator. It is desirable, therefore, that the servo be able to exert a large force on the actuator if it sticks. To accomplish this with a relatively small input command and in the presence of a high force feedback gain as forenoted, dead-zone circuits 16, 16A, 16B and 16C are included in the feedback loops of each of the respective channels, 2, 2A, 2B and 2C.

The desirability of the aforenoted dead-zone circuits is better understood when it is considered that the tendency of the system, as previously mentioned, is for the several servo channels to saturate in force opposition. This results in "lockup", or the lack of movement of output member 20. Although force feedback prevents the aforenoted "lockup", it also has the effect of reducing the force gradient of the system i.e. for a given input to the system there is little force exerted on output member 20. This condition is undesirable, expecially when the system must be capable of exerting a large force on the output member to displace the member when it sticks. Dead-zone circuits 16, 16A, 16B and 16C overcome this disadvantage by providing a zone of operation where there is no force feedback to detract from the force gradient.

With reference to FIG. 2A, then, input signal $E_i$ is the signal from force sensor 14 and output signal $E_0$ is the output of dead-zone circuit 16. Signal $E_0$ is applied to servo amplifier 4.

Each of the dead-zone circuits 16, 16A, 16B, 16C includes diodes 30 and 32 connected in opposing relation and resistors 34 and 36 connected to diodes 30 and 32 respectively, and through which diodes and resistors signal $E_i$ is applied to a summing amplifier 38 having a resistor 40 connected in feedback relation thereto. A suitable d.c. source shown as a battery 42 provides a positive voltage at a predetermined level and is connected through a resistor 44 to a point 46 intermediate between resistor 34 and amplifier 38. A suitable d.c. source shown as a battery 48 provides a voltage at the predetermined level but in a negative sense and is connected to point 46 through a resistor 50.

The elements of deadspace circuit 16 as shown in FIG. 2A interact to provide an output as shown in FIG. 2B, wherein it will be seen that for a specific operating zone designated AB, determined by the aforenoted predetermined voltage level, there is no force feedback signal for application to the respective servo amplifiers so that the force gradient of the system does not deteriorate.

It will be seen from the aforegoing description that the redundant servo system of the invention is useful in applications where an extremely low probability of loss of servo function is required as may be the case in a manned aerospace vehicle. The system is quadruple redundant for operation after two failures and passive after a third failure. The particular configuration of the device alleviates the channel-to-channel sensitivity without the necessity for cross channel electrical equalizing. Moreover, force feedback is utilized to reduce errors between the input commands, follow-up signals and transfer valve amplifiers, while a dead-zone is provided for realizing the full effect of the force gradient of the system.

As heretofore noted, friction means 12, in the preferred embodiment of the invention, is included as part of the ram cylinder. In this connection reference is made to FIG. 3. In the figure hydraulic ram 10 is shown as including a cylinder 10A and a piston 10B. The outside diameter of the piston is generally slightly less than the inside diameter of the cylinder, with the piston sliding in the cylinder when the hydraulic fluid exerts a force on the piston. By reducing the inside diameter of the cylinder a predetermined sliding friction between the cylinder and piston at 12 is created, and it is this friction that renders the system operable after two channels fail and passive after a third failure as aforenoted.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A servo system having four redundant channels coupled to a common output member for displacing the member, each of the channels comprising:
   means for supplying hydraulic fluid at a predetermined pressure;
   hydraulic ram means;
   a transfer valve intermediate the fluid supplying means and the ram means for transferring fluid to said ram means and said ram means thereupon exerting a force;
   friction means coupled to the ram means for providing a friction force at a predetermined level;
   the common output member being displaced by the net of the ram and friction forces;

means for providing a command signal;

follow-up means for providing a signal corresponding to the net of the ram and friction forces;

a force sensor for sensing the net of the ram and friction forces and for providing a corresponding signal;

means for applying the command, follow-up and force sensor signals to the transfer valve with the transfer valve being responsive to said signals for transferring the fluid to the ram means; and the predetermined friction level being slightly higher than the maximum expected force difference produced by the hydraulic fluid supply pressure of two remaining channels after two channels have failed, and following a third channel failure displacement of the common output member is prevented.

2. A servo system as described by claim 1, including:

a dead-zone circuit connected to the force sensor, and for a particular zone of the force sensor signal the level of the signal applied to the applying means is zero.

3. A servo system as described by claim 2, including:

a threshold detector providing a signal when the net of the ram and friction forces exceeds a predetermined threshold; and the means for supplying hydraulic fluid at a predetermined pressure being connected to the threshold detector and responsive to the signal therefrom for cutting-off the fluid supply.

* * * * *